United States Patent
DiaaEldin et al.

(10) Patent No.: US 8,359,173 B2
(45) Date of Patent: Jan. 22, 2013

(54) SYSTEM AND METHODS FOR DYNAMIC POWER ESTIMATION FOR A DIGITAL CIRCUIT

(75) Inventors: Khalil DiaaEldin, Portland, OR (US); Ismail Yehea, Morton Grove, IL (US); Sinha Debjit, Wappinger Falls, NY (US); Zhou Hai, Glenview, IL (US)

(73) Assignee: Northwestern University, Evanston, IL (US)

( * ) Notice: Subject to any disclaimer, the term of this patent is extended or adjusted under 35 U.S.C. 154(b) by 1111 days.

(21) Appl. No.: 12/267,472

(22) Filed: Nov. 7, 2008

(65) Prior Publication Data
US 2009/0119037 A1 May 7, 2009

Related U.S. Application Data

(60) Provisional application No. 60/986,216, filed on Nov. 7, 2007.

(51) Int. Cl.
*G01R 21/00* (2006.01)
(52) U.S. Cl. .......................................................... 702/60
(58) Field of Classification Search .................. 702/60
See application file for complete search history.

(56) References Cited

U.S. PATENT DOCUMENTS

2005/0204316 A1* 9/2005 Nebel et al. .................. 716/2

OTHER PUBLICATIONS

D. Liu and C. Svensson, "Power consumption estimation in CMOS VLSI chips," in IEEE Journal of Solid State Circuits, vol. 29, 1994, pp. 663-670.
R. Mehra, L. M. Guerra, and J. M. Rabaey, "A partitioning scheme for optimizing interconnect power," in IEEE Journal of Solid State Circuits, vol. 32, 1997, pp. 433-443.
P. Gupta and A. B. Kahng, "Quantifying error in dynamic power estimation of CMOS circuits," in Proc. Intl. Symposium on Quality Electronic Design, 2003, pp. 273-278.
S. C. Wong, G. Y. Lee, and D. J. MA, "Modeling of interconnect capacitance, delay and crosstalk in VLSI," in IEEE Transactions on Semiconductor Manufacturing, vol. 13, 2000, pp. 108-111.
International Technology Roadmap for Semiconductors, 2001 Edition, Semiconductor Industry Association, http://public.itrs.net.
M. Ghoneima and Y. Ismail, "Effect of relative delay on the dissipated energy in coupled interconnects," in Proc. Intl. Symposium on Circuits and Systems, 2004, pp. 525-528.
F. Naim, R. Burch, P. Yang, and I. Hajj, "Probabilistic simulation for reliability analysis of CMOS VLSI circuits," in IEEE Transactions on Computer Aided Design, 1990, pp. 439-450.
G. I. Stamoulis and I. N. Hajj, "Improved techniques for probabilistic simulation including signal correlation effects," in Proc. of the Design Automation Conf., 1993, pp. 379-383.
C. Y. Tsui, M. Pedram, and A. M. Despain, "Efficient estimation of dynamic power consumption under a real delay model," in Proc. Intl. Conf. on Computer-Aided Design, 1993, pp. 224-228.
C.S. Ding, C.Y. Tsui, M. Pedram, "Gate-level power estimation using tagged probabilistic simulation," in IEEE Transactions on Computer Aided Design, 1998, vol. 17, No. 11, pp. 1099-1107.
F. Najm, "A survey of power estimation techniques in VLSI circuits," IEEE Transactions on VLSI Systems, 1994, vol. 2, No. 4, pp. 446-455.

(Continued)

*Primary Examiner* — Stephen Cherry
(74) *Attorney, Agent, or Firm* — Morris, Manning & Martin, LLP; Tim Tingkang Xia, Esq.

(57) ABSTRACT

A method for dynamic timing-dependent power estimation for a digital circuit having coupled interconnects and at least two gates. In one embodiment, the method includes the steps of capturing information on relative switching activities and timing dependence for the coupled interconnects in the digital circuit, estimating the probabilities associated with switching activities and timing dependence for each gate in the digital circuit from the captured information, and obtaining dynamic power estimation of the digital circuit from the estimations of the probabilities.

17 Claims, 11 Drawing Sheets

OTHER PUBLICATIONS

C.Y. Tsui, J. Monteiro, M. Pedram, A. Despain, S. Devadas, B. Lin, "Power Estimation Methods for Sequential Logic Circuits," IEEE Transactions on VLSI Systems, 1995, vol. 3, No. 3, pp. 404-416.

T. Uchino and J. Cong, "An interconnect energy model considering coupling effects," in Proc. of the Design Automation Conf., 2001, pp. 555-558.

A. Ghosh, S. Devdas, K. Keutzer, and J. White, "Estimation of average switching activity in combinational and sequential circuits," in Proc. of the Design Automation Conf., 1992, pp. 253-259.

R. Marculescu, D. Marculescu, M. Pedram, "Probabilistic modeling of dependencies during switching activity analysis," in IEEE Transactions on Computer Aided Design, 1998, vol. 17, No. 2, pp. 73-83.

M. Xakellis and F. Najm, "Statistical estimation of the switching activity in digital circuits," in Proc. of the Design Automation Conf., 1994, pp. 728-733.

A. Agarwal, K. Chopra, and D. Blaauw, "Statistical timing based optimization using gate sizing," in Proc. DATE: Design Automation and Test in Europe, 2005, pp. 400-405.

F. Najm, "Transition Density: a new measure of activity in digital circuits," IEEE Transactions on Computer-Aided Design, vol. 12, No. 2, pp. 310-323, Feb. 1993.

F. Najm, "Improved estimation of the switching activity for reliability prediction on VLSI circuits," IEEE Custom Integrated Circuits Conference, pp. 17.7.1-17.7.4, San Diego, CA, May 1-4, 1994.

F. Najm, "Low-pass filter for computing the transition density in digital circuits," IEEE Transactions on Computer-Aided Design, vol. 13, No. 9, pp. 1123-1131, Sep. 1994.

R. Burch, F. Najm, P. Yang, and T. Trick, "McPOWER: A Monte Carlo approach to power estimation," IEEE/ACM International Conference on Computer-Aided Design, Santa Clara, pp. 90-97, Nov. 8-12, 1992.

R. Burch, F. Najm, P. Yang, and T. Trick, "A Monte Carlo approach for power estimation," IEEE Transactions on VLSI Systems, vol. 1, No. 1, pp. 63-71, Mar. 1993.

S. M. Kang, "Accurate simulation of power dissipation in VLSI circuits," in IEEE Journal of Solid State Circuits, vol. 21 (5), 1986, pp. 889-891.

* cited by examiner

100

500

800

(a)

(b)

900

$$p_{opp}(\delta) = \int_{-\infty}^{\infty} \phi_{x_i}^r(t)\, \phi_{y_j}^f(t+\delta)\, dt$$

$P_{opp} = \tfrac{1}{2} C_c V_{dd}^2 \cdot Area$

1000

1100

SYSTEM AND METHODS FOR DYNAMIC POWER ESTIMATION FOR A DIGITAL CIRCUIT

CROSS-REFERENCE TO RELATED PATENT APPLICATION

This application claims the benefit, pursuant to 35 U.S.C. §119(e), of U.S. provisional patent application Ser. No. 60/986,216, filed Nov. 7, 2008, entitled "Using Timing Information For Accurate Coupling Power Estimation," by DiaaEldin Khalil, Yehea Ismail, Debjit Sinha, and Hai Zhou, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [4] represents the 4$^{th}$ reference cited in the reference list, namely, P. Gupta and A. B. Kahng, "Quantifying error in dynamic power estimation of CMOS circuits," in Proc. Intl. Symposium on Quality Electronic Design, 2003, pp. 273-278.

FIELD OF THE INVENTION

The present invention generally relates to power estimation for a digital circuit, and more particularly, to a system and methods for dynamic timing-dependent power estimation for a digital circuit.

BACKGROUND OF THE INVENTION

Accurate power estimation is an important problem in modern integrated circuits design. Currently, more than 60% of the dynamic power is consumed in the interconnect capacitances [1-4] due to the decreased gate load capacitances relative to the parasitic interconnect capacitances. Thus, accurate estimation of power dissipated in the interconnects is important. Previously, the parasitic capacitances of the interconnects to the ground were only considered. However, the parasitic coupling capacitances between interconnects are now growing more significant [5, 6]. Interconnect parasitic resistance and dimensions are currently the limiting factor of integration density [6]. With the progress of deep submicron technology, the aspect ratio of the interconnects increases significantly while the width and the spacing are reduced to allow low parasitic resistance while maintaining good integration density. With reduced width, the parasitic capacitance to ground decreases, and with reduced spacing, the parasitic coupling capacitance increases. As a result, the coupling capacitance is growing to dominate the total parasitic capacitance. In 90 nm technology, the ratio of parasitic coupling to ground capacitances of a typical interconnect is nearly 5.5. It is therefore evident that, with technology scaling, the component of power dissipation in parasitic coupling capacitances (coupling power) is becoming very significant.

Some approaches have been proposed to estimate the average power dissipation in digital circuits. However, prior work in power estimation has not considered coupling power estimation with detailed timing analysis. That is, the timing dependence of coupling power and the effects of relative switching delays have been ignored.

Therefore, a heretofore unaddressed need exists in the art to address the aforementioned deficiencies and inadequacies.

SUMMARY OF THE INVENTION

In one aspect, the present invention relates to a method for dynamic timing-dependent power estimation for a digital circuit having coupled interconnects and at least two gates. In one embodiment, the method includes the steps of capturing information on relative switching activities and timing dependence for the coupled interconnects in the digital circuit, estimating the probabilities associated with switching activities and timing dependence for each gate in the digital circuit from the captured information, and obtaining dynamic power estimation of the digital circuit from the estimations of the probabilities.

In one embodiment, the step of estimating the probabilities associated with switching activities and timing dependence includes the step of calculating the probability that a particular switching activity occurs at a specific time, for each gate in the digital circuit. This step includes calculating the relative switching probability for rise, fall, stay low, and stay high, for each gate of the digital circuit. In one embodiment, the step of estimating the probabilities associated with switching activities and timing dependence includes calculating a switching probability density function (PDF) for each gate in the digital circuit. The step of calculating the probability e step of calculating the probability density function includes estimating the probability that the coupled interconnects switch in the same direction or opposite directions, as a function of the relative delay between each respective switching time, for rise and fall. For a switching window defining a specific interval of time, the switching window is represented as a set of sub-switching windows for rise and fall, wherein each sub-switching window has a constant probability density function.

In one embodiment, the step of obtaining the dynamic power estimation includes the steps of calculating the average dynamic power dissipated per clock cycle for each gate in the circuit and summing all of the respective dynamic power dissipations together. The step of calculating the average dynamic power dissipated for each gate further includes calculating the total output capacitance to ground of the neighbors switching, along with an associated coupling power factor, and calculating the coupling power contributed from components of the coupling capacitors for the coupled interconnects. In one embodiment, the coupling power components include coupling power when a respective coupled neighbor is not switching, coupling power when a respective coupled neighbor is switching in the opposite direction, as a function of the probability density function corresponding to two coupled interconnects in specific coupling interconnect switching in opposite directions, and based at least in part on the relative delay between each of the neighbors switching and the associated coupling power factor. The coupling power components also include coupling power when a respective coupled neighbor is switching in the opposite direction, as a function of the probability density function corresponding to two coupled interconnects switching in opposite directions, and based at least in part on the relative delay between each of the neighbors switching and an associated coupling power factor. The coupling power components also include coupling power when a respective coupled neighbor is switching in the same direction, as a function of the probability density function corresponding to two coupled interconnects switching the same direction, and based at least in part on the relative delay between each of the neighbors switching, and an associated coupling power factor.

In one embodiment, the method further includes the step of calculating a toggle power associated with the coupled interconnects as a function of the relative delay between switching times of the respective inputs for each gate in the digital circuit.

In another aspect, the present invention relates to a method for dynamic timing-dependent power dissipation estimation for a digital circuit having coupled interconnects and a plurality of gates. In one embodiment, the method includes the steps of capturing information on relative switching activities and timing dependence for the coupled interconnects in the digital circuit and representing the captured information on the relative switching activities and the timing dependence as estimations formed at least in part from probability functions. Additionally, the method includes the steps of propagating the representations through the digital circuit, calculating the dynamic power dissipation and toggle power associated with the coupled interconnects for the digital circuit based on the representations propagated through the digital circuit and estimating the power dissipation for the digital circuit based at least in part on the calculated dynamic switching power and toggle power associated with the coupled interconnects.

In yet another aspect, the present invention relates to a system for dynamic timing-dependent power estimation for a digital circuit including coupled interconnects and at least two gates. In one embodiment, the system includes a controller programmed to perform the steps of capturing information on relative switching activities and timing dependence for the coupled interconnects in the digital circuit, estimating the probabilities associated with switching activities and timing dependence for at least one gate in the digital circuit from the captured information, and obtaining dynamic power estimation of the digital circuit from the estimations of the probabilities. The system also includes a memory device in communication with the controller, to store the captured information.

In one embodiment, the step of estimating the probabilities associated with switching activities and timing dependence includes the step of calculating the probability that a particular switching activity occurs at a specific time, for each gate in the digital circuit. This step includes calculating the relative switching probability for rise, fall, stay low, and stay high for each gate of the digital circuit, and it alos includes them. The step of estimating the probabilities associated with switching activities and timing dependence includes calculating a switching probability density function for each gate in the digital circuit. Further, the step of calculating the probability density function includes estimating the probability that the coupled interconnects switch in the same direction or opposite directions, as a function of the relative delay between each respective switching time, for rise and fall. In one embodiment, the controller is further programmed to perform the step of, for a switching window defining a specific interval of time, representing the switching window as a set of sub-switching windows for rise and fall, where each sub-switching window has a constant probability density function. The step of obtaining the dynamic power estimation includes the steps of calculating the average dynamic power dissipated per clock cycle for each gate in the circuit, and summing all of the respective dynamic power dissipations together. Moreover, the step of calculating the average dynamic power dissipated for each gate further includes the steps of calculating the total output capacitance to ground of the neighbors switching, and an associated coupling power factor. In addition, coupling power contributed from components is calculated with the coupling capacitors for the coupled interconnects. In one embodiment, the coupling power components include coupling power when a respective coupled neighbor is not switching, coupling power when a respective coupled neighbor is switching in the opposite direction, as a function of the probability density function corresponding to two coupled interconnects in specific coupling interconnect switching in opposite directions, and based at least in part on the relative delay between each of the neighbors switching and the associated coupling power factor. The coupling power components further comprise coupling power when a respective coupled neighbor is switching in the opposite direction, as a function of the probability density function corresponding to two coupled interconnects switching in opposite directions, and based at least in part on the relative delay between each of the neighbors switching and an associated coupling power factor and, coupling power when a respective coupled neighbor is switching in the same direction, as a function of the probability density function corresponding to two coupled interconnects switching in opposite directions, and based at least in part on the relative delay between each of the neighbors switching, and an associated coupling power factor.

In one embodiment, the controller is further programmed to perform the step of calculating a toggle power associated with the coupled interconnects as a function of the relative delay between switching times of the respective inputs for each gate in the digital circuit.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
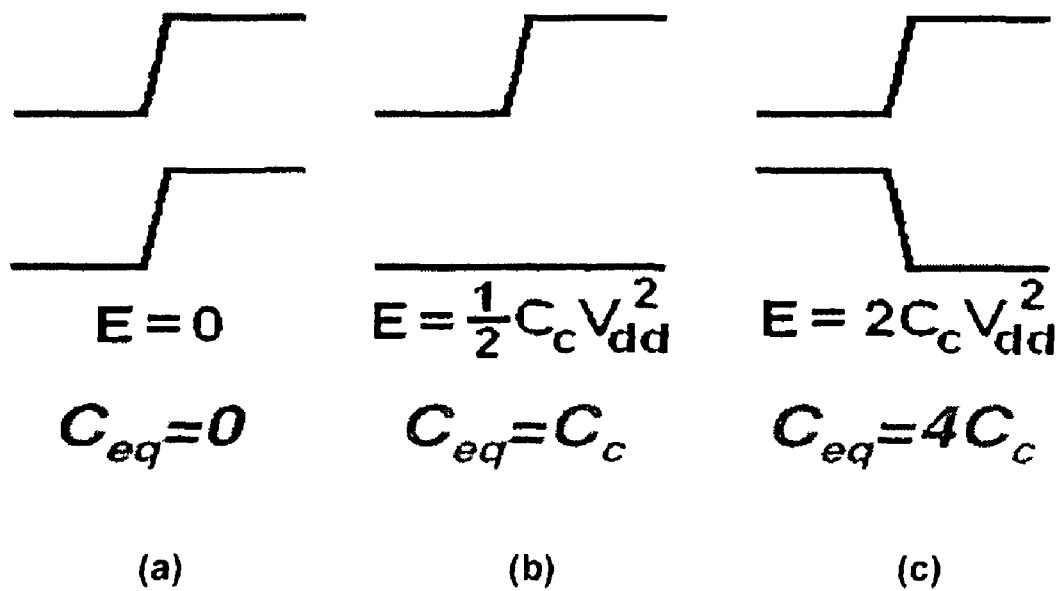
FIG. 1 shows schematically various relative switching activities and the corresponding dissipated energy for each.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

Definitions

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

Overview of the Invention

The description will be made as to the embodiments of the present invention in conjunction with the accompanying drawing FIGS. 1-11.

Now referring to FIGS. 1-4, in one aspect, the present invention relates to a method for dynamic timing-dependent power estimation for a digital circuit having coupled interconnects and at least two gates. In one embodiment, the method includes the steps of capturing information on relative switching activities and timing dependence for the coupled interconnects in the digital circuit, estimating the probabilities associated with switching activities and timing dependence for each gate in the digital circuit from the captured information, and obtaining dynamic power estimation of the digital circuit from the estimations of the probabilities.

Figure 5:
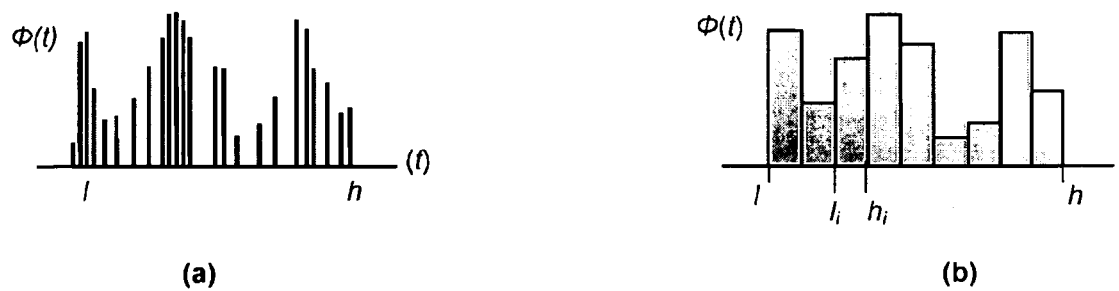
FIG. 5 show schematically (a) a typical shape of an arbitrary switching PDF and (b) a proposed representation, in accordance with one embodiment of the present invention.
Figure 6:
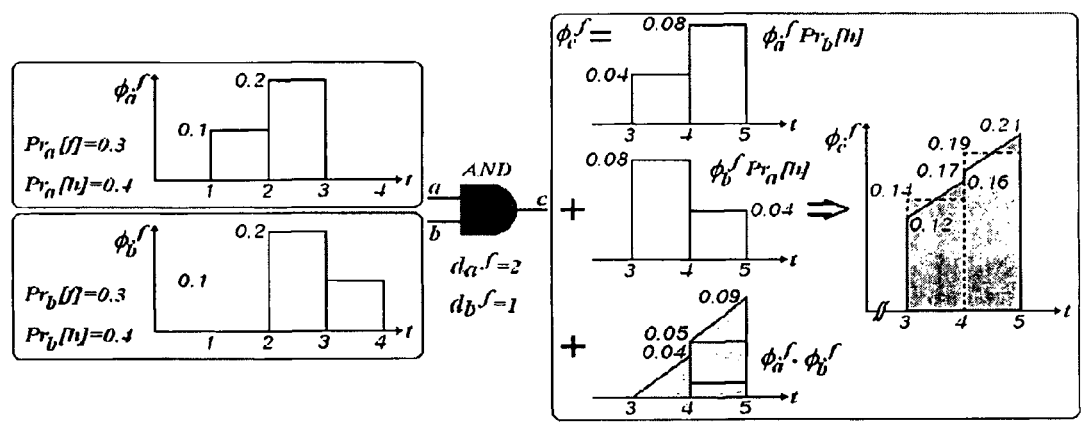
FIG. 6 shows a flow chart of a switching PDF example, in accordance with one embodiment of the present invention.
Figure 7:
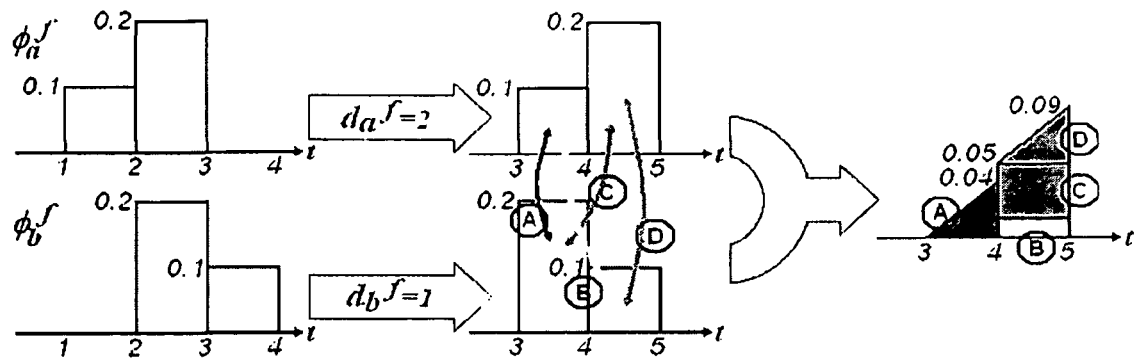
FIG. 7 shows a flow chart illustrating calculation details of a term in the switching PDF calculation example of FIG. 6.

In one embodiment, the step of estimating the probabilities associated with switching activities and timing dependence includes the step of calculating the probability that a particular switching activity occurs at a specific time (e.g. $p_{sim}(\delta)$, $p_{opp}(\delta)$), for each gate in the digital circuit. This step includes calculating the relative switching probability for rise, fall, stay low, and stay high (Pr[r], Pr[f], Pr[l], Pr[h], respectively) for each gate of the digital circuit (see also FIG. 11). In one embodiment, the step of estimating the probabilities associated with switching activities and timing dependence includes calculating a switching probability density function $\phi(t)$ for each gate in the digital circuit. The step of calculating the probability density function $\phi(t)$ includes estimating the probability that the coupled interconnects switch in the same direction ($p_{sim}(\delta)$) or opposite directions ($p_{opp}(\delta)$) as a function of the relative delay $\delta$ between each respective switching time (t), for rise and fall. As shown in FIGS. 5-7, for a switching window x defining a specific interval of time [1, h], the switching window is represented as a set of M sub-switching windows for rise and fall, wherein each sub-switching window has a constant probability density function $\phi(t)$.

Now referring to FIGS. 6-11, in one embodiment, the step of obtaining the dynamic power estimation includes the steps of calculating the average dynamic power dissipated $P_d$ per clock cycle for each gate in the circuit and summing all of the respective dynamic power dissipations $P_d$ together. The step of calculating the average dynamic power dissipated $P_d$ for each gate further includes calculating the total output capacitance to ground $C_g$ of the neighbors switching, a long with an associated coupling power factor $\psi$, and calculating the coupling power $P_c$ contributed from components of the coupling capacitors $C_c$ for the coupled interconnects.

In one embodiment, the coupling power components include coupling power when a respective coupled neighbor is not switching and its associated probability $P_{quiet}$, coupling power when a respective coupled neighbor is switching in the opposite direction, as a function of the probability density function $p_{opp}$ corresponding to two coupled interconnects in specific coupling interconnect switching in opposite directions, and based at least in part on the relative delay $\delta$ between each of the neighbors switching and the associated coupling power factor $\psi$. The coupling power components also include coupling power when a respective coupled neighbor is switching in the same direction, as a function of the probability density function $p_{sim}$ corresponding to two coupled interconnects switching the same direction, and based at least in part on the relative delay $\delta$ between each of the neighbors switching, and an associated coupling power factor $\psi$.

In one embodiment, the method further includes the step of calculating a toggle power $\phi$ associated with the coupled interconnects as a function of the relative delay $\delta$ between switching times of the respective inputs for each gate in the digital circuit.

In another aspect, the present invention relates to a method for dynamic timing-dependent power dissipation estimation for a digital circuit having coupled interconnects and a plurality of gates. In one embodiment, the method includes the steps of capturing information on relative switching activities and timing dependence for the coupled interconnects in the digital circuit and representing the captured information on the relative switching activities and the timing dependence as estimations formed at least in part from probability functions. Additionally, the method includes the steps of propagating the representations through the digital circuit, calculating the dynamic power dissipation and toggle power associated with the coupled interconnects for the digital circuit based on the representations propagated through the digital circuit and estimating the power dissipation for the digital circuit based at least in part on the calculated dynamic switching power and toggle power associated with the coupled interconnects.

In yet another aspect, the present invention relates to a system for dynamic timing-dependent power estimation for a digital circuit including coupled interconnects and at least two gates. In one embodiment, the system includes a controller programmed to perform the steps of capturing information on relative switching activities and timing dependence for the coupled interconnects in the digital circuit, estimating the probabilities associated with switching activities and timing dependence for at least one gate in the digital circuit from the captured information, and obtaining dynamic power estimation of the digital circuit from the estimations of the probabilities. The system also includes a memory device in communication with the controller, to store the captured information.

In one embodiment, the step of estimating the probabilities associated with switching activities and timing dependence includes the step of calculating the probability that a particular switching activity occurs at a specific time, for each gate in the digital circuit. This step includes calculating the relative switching probability for rise, fall, stay low, and stay high for each gate of the digital circuit, and it also includes them. The step of estimating the probabilities associated with switching activities and timing dependence includes calculating a switching probability density function for each gate in the digital circuit. Further, the step of calculating the probability density function includes estimating the probability that the coupled interconnects switch in the same direction or opposite directions, as a function of the relative delay between each respective switching time, for rise and fall. In one embodiment, the controller is further programmed to perform the step of, for a switching window defining a specific interval of time, representing the switching window as a set of sub-switching windows for rise and fall, where each sub-switching window has a constant probability density function. The step of obtaining the dynamic power estimation includes the steps of calculating the average dynamic power dissipated per clock cycle for each gate in the circuit, and summing all of the respective dynamic power dissipations together. Moreover, the step of calculating the average dynamic power dissipated for each gate further includes the steps of calculating the total output capacitance to ground of the neighbors switching, and an associated coupling power factor. In addition, coupling power contributed from components is calculated with the coupling capacitors for the coupled interconnects. In one embodiment, the coupling power components include coupling power when a respective coupled neighbor is not switching, coupling power when a respective coupled neighbor is switching in the opposite direction, as a function of the probability density function corresponding to two coupled interconnects in specific coupling interconnect switching in opposite directions, and based at least in part on the relative delay between each of the neighbors switching and the associated coupling power factor. The coupling power components further comprise coupling power when a respective coupled neighbor is switching in the opposite direction, as a function of the probability density function corresponding to two coupled interconnects switching in opposite directions, and based at least in part on the relative delay between each of the neighbors switching and an associated coupling power factor and, coupling power when a respective coupled neighbor is switching in the same direction, as a function of the probability density function corresponding to two coupled interconnects switching in opposite directions, and based at least in part on the relative delay between each of the neighbors switching, and an associated coupling power factor.

In one embodiment, the controller is further programmed to perform the step of calculating a toggle power associated with the coupled interconnects as a function of the relative delay between switching times of the respective inputs for each gate in the digital circuit.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

FIG. 1 shows schematically various of relative switching and the corresponding dissipated energy for each.

Figure 2:
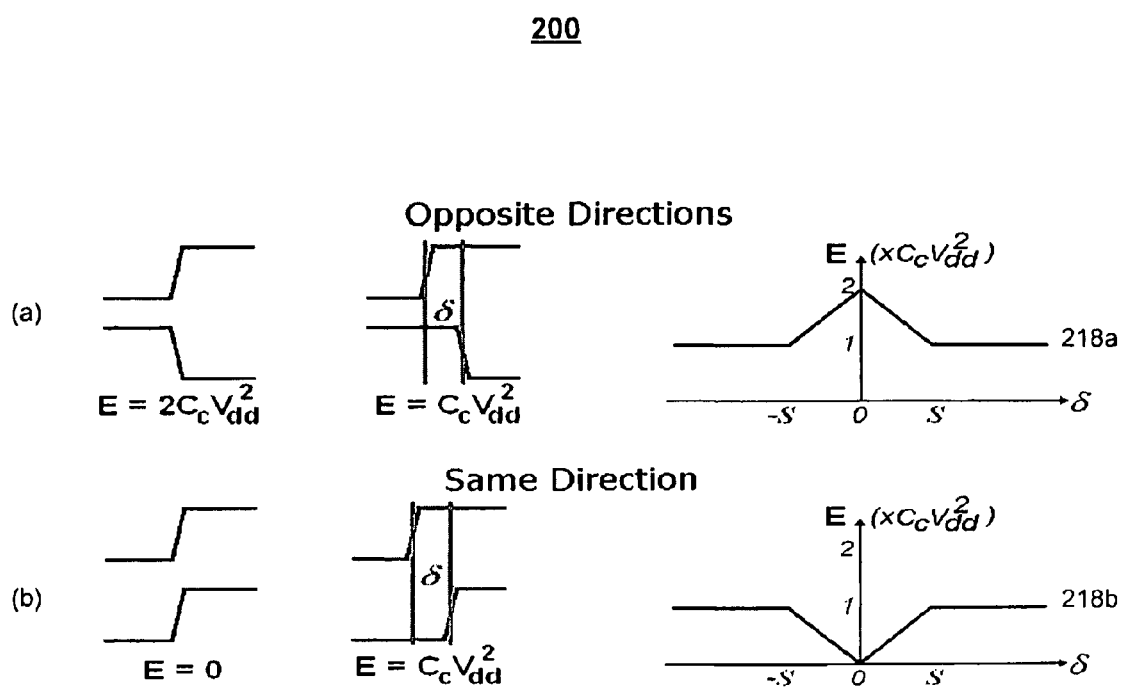
FIG. 2 shows schematically the dependence of energy dissipation on the differences between switching times of coupled interconnects.

FIG. 2 shows schematically dependence of energy dissipation on the difference between switching times of coupled interconnects.

Figure 3:
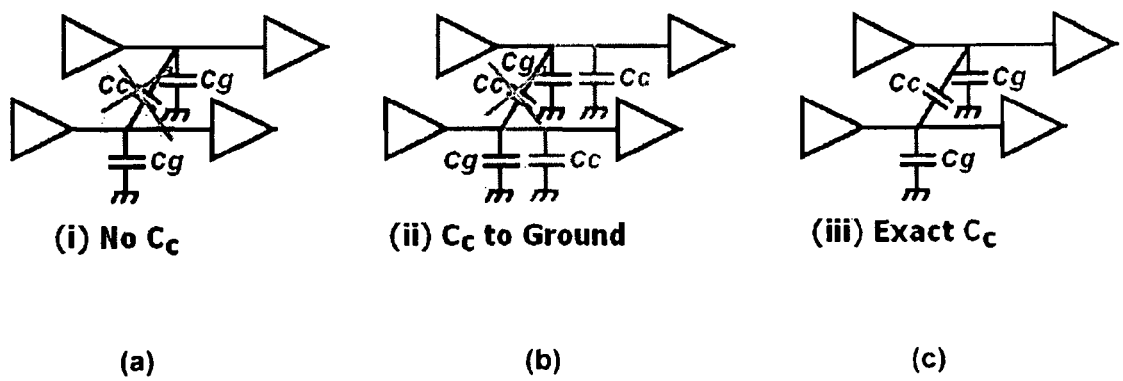
FIG. 3 shows schematically examples of handling coupling capacitance in performed simulations.

FIG. 3 shows schematically examples of handling coupling capacitance in performed simulations.

Figure 4:
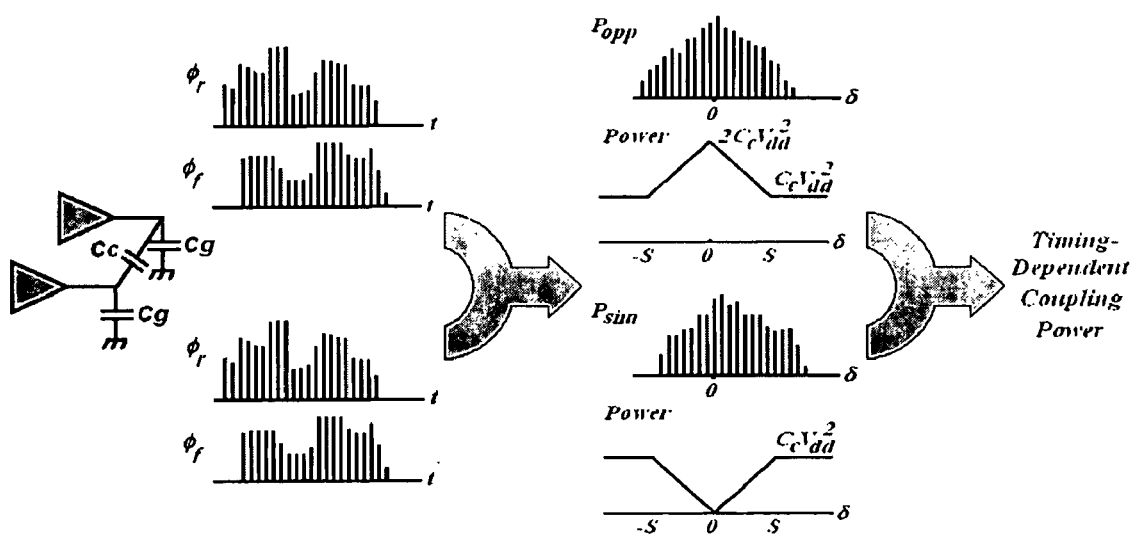
FIG. 4 shows a flow chart illustrating the need for switching PDFs in calculating coupling power, according to one embodiment of the present invention.

FIG. 4 shows a flow chart illustrating the need for switching PDFs in calculating coupling power, according to one embodiment of the present invention.

FIG. 5 show schematically (a) a typical shape of an arbitrary switching PDF and (b) a proposed representation, in accordance with one embodiment of the present invention.

FIG. 6 shows a flow chart of a switching PDF example, in accordance with one embodiment of the present invention.

FIG. 7 shows a flow chart illustrating calculation details of a term in the switching PDF calculation example of FIG. 6.

Figure 8:
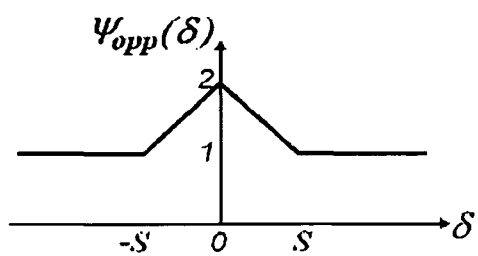
FIG. 8 shows schematically typical models for coupling power factors, in accordance with one embodiment of the present invention.
Figure 8:
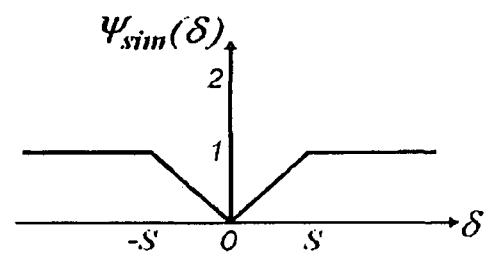

FIG. 8 shows schematically typical models for coupling power factors, in accordance with one embodiment of the present invention.

Figure 9:
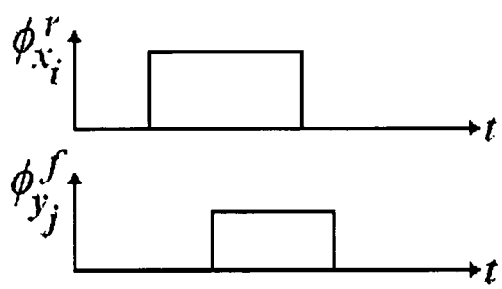
FIG. 9 shows schematically an example of calculating a probability that coupled interconnects switch in opposite directions for a single pair of sub-switching-windows, in accordance with one embodiment of the present invention.
Figure 9:
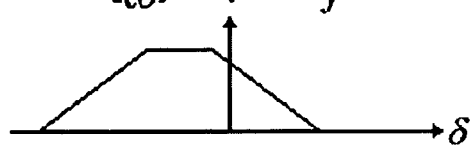
Figure 9:
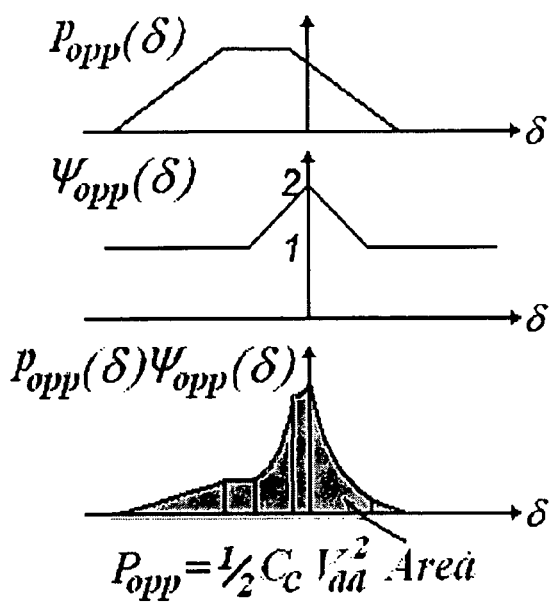

FIG. 9 shows schematically an example of calculating a probability that coupled interconnects switch in opposite directions for a single pair of sub-switching-windows, in accordance with one embodiment of the present invention.

Figure 10:
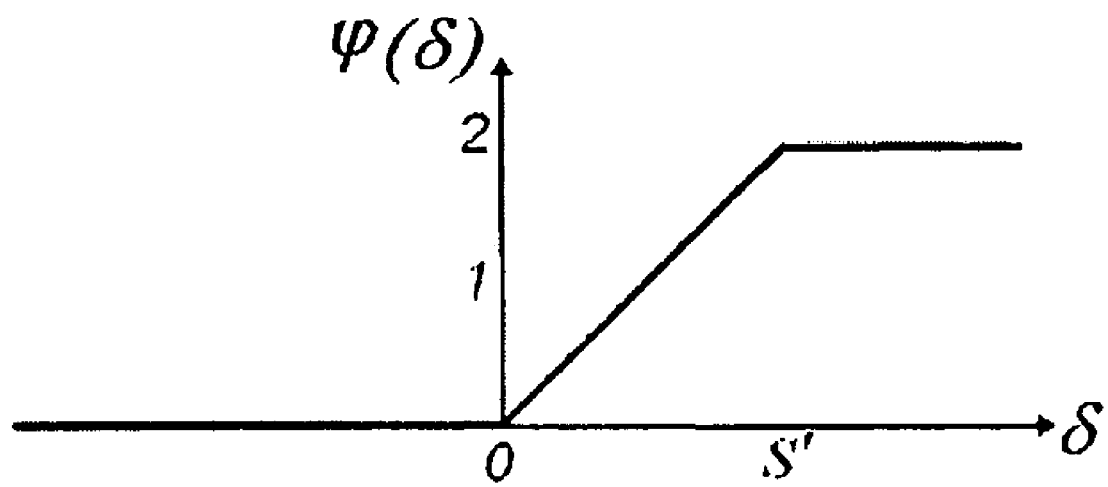
FIG. 10 shows schematically a model for an effective toggle power factor, in accordance with one embodiment of the present invention.

FIG. 10 shows schematically a model for an effective toggle power factor, in accordance with one embodiment of the present invention.

Figure 11:
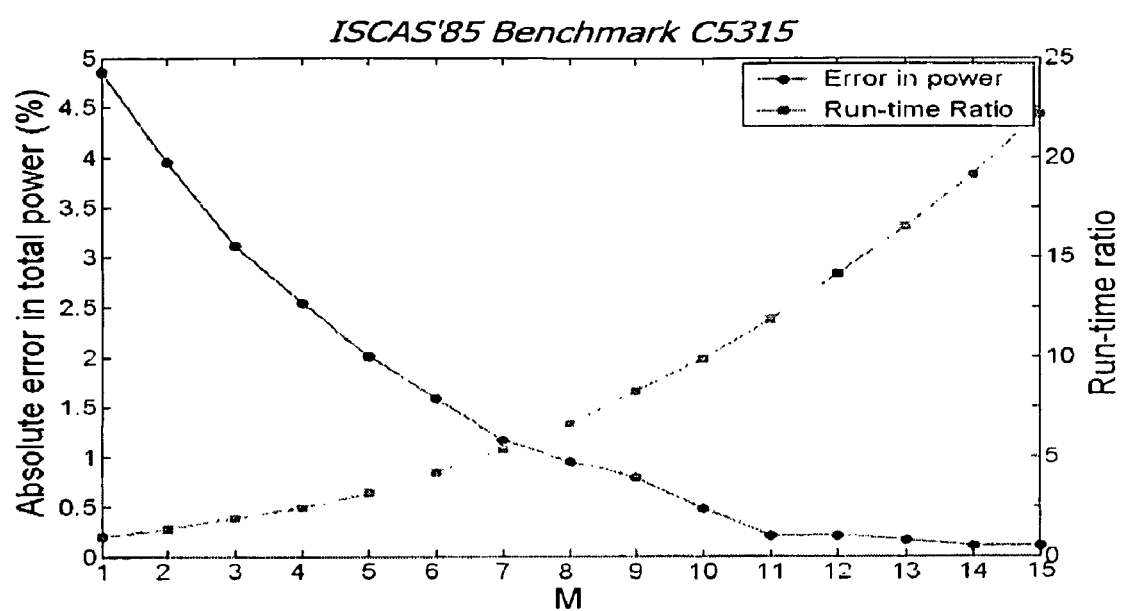
FIG. 11 shows a graph of percentage error and run-time ratios with varying M for embodiment of the present invention.

FIG. 11 shows a graph of percentage error and run-time ratios with varying M for embodiment of the present invention.

IMPLEMENTATIONS AND EXAMPLES OF THE INVENTION

Without intent to limit the scope of the invention, exemplary methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Referring now to FIGS. 1-3, calculating power dissipation in coupling capacitance is complicated as compared to the case of capacitance to ground. In the latter case, the parasitic capacitances to ground are charged and discharged depending on voltage transitions (switching activity) of the output of the gate in exactly the same way as the load capacitance, and hence, just add an energy component of $E_G=\frac{1}{2}C_g V_{DD}^2$ when the output switches, which is similar to that of the load capacitance. In this case, the dissipated power in an interconnect is only dependent on its switching activity. On the other hand, power dissipation in a parasitic coupling capacitance between two interconnects is dependent on the voltage difference across that capacitance which in turn is dependent on the interconnects relative switching activities [7]. The voltage across a coupling capacitance can take a value of $-V_{DD}$, 0, or $+V_{DD}$ in contrast to that of a capacitance to ground which can only take a value of 0 or $V_{DD}$. Thus, the worst-case voltage change across a coupling capacitance in a single transition (clock cycle) is $2V_{DD}$ in contrast to only $V_{DD}$ for a capacitance to ground. FIG. 1 illustrates the different cases of relative switching activity and the corresponding dissipated energy. When two coupled interconnects x and y, with coupling capacitance $C_C$, simultaneously switch in the same direction, there is no charging or discharging of $C_C$, and no energy is dissipated in the coupling capacitance; $E_C=0$. When only one of the interconnects switch, $C_C$ is charged or discharged for a voltage change of $V_{DD}$, and the energy dissipated in the coupling capacitance is $E_C=\frac{1}{2}C_C V_{DD}^2$. Finally, when the interconnects simultaneously switch in opposite directions, $C_C$ is charged or discharged for a voltage change of $2V_{DD}$, and the energy dissipated in the coupling capacitance becomes $E_C=\frac{1}{2}C_C(2V_{DD})^2=2C_C V_{DD}^2$.

In addition to the dependence of the coupling power on the relative switching activities of the coupled interconnects, coupling power is also dependent on the relative delay $\delta$ between the switchings on the two coupled interconnects (i.e. the difference between their switching times) [7]. As relative delay $\delta$ increases, the cases of simultaneous switching ($\delta=0$) reduce gradually to two independent cases of single switching on each interconnect (for large $\delta$) as shown in FIG. 2. The energy dissipated in the two independent cases of single switching on each interconnect is $E_C=2(\frac{1}{2}C_C V_{DD}^2)=C_C V_{DD}^2$. The dependence of the energy dissipated in the coupling capacitance is an even function of the relative delay $\delta$ as shown in FIG. 2. For the case of switching in the same direction, dissipated energy can therefore vary from 0 to $C_C V_{DD}^2$ depending on the relative delay $\delta$. Similarly, for the case of switching in opposite directions, dissipated energy can vary from $2C_C V_{DD}^2$ to $C_C V_{DD}^2$ depending on the relative delay $\delta$. Therefore in consideration of timing information and relative delays, in addition to as well as switching activities, are important for accurate coupling power estimation.

Furthermore, the dependence on relative switching activities translates to dependence on the logic functional information of the circuit. For example, the outputs of an AND gate and an OR gate have different switching probabilities, even for identical input switching probabilities. This implies that coupling power is also dependent on the circuit functionality and the logic implementation. Therefore, switching and delay probabilities should be calculated for all the interconnects. This also indicates that accurate coupling power estimation should be performed on the gate level and not at a higher level of the design.

To illustrate the significance of the timing dependence of coupling power, HSPICE simulations in 90 nm technology are performed for two coupled interconnects with typical local interconnect dimensions and driving and loading gates. The energy dissipation per switching in the circuit is evaluated for the cases of: (i) single one-wire switching, (ii) simultaneous switching in the same direction, (iii) simultaneous switching in opposite directions, (iv) switching in the same direction with large relative delay, and (v) switching in opposite directions with large relative delay. Results obtained are presented in Table 1 as shown by FIG. 3. For each of the above cases, simulations are performed when (i) the coupling capacitance is ignored (no $C_C$); (ii) the coupling capacitance is modeled as capacitance connected to ground ($C_C$ to ground); and (iii) the coupling capacitance connects both interconnects (exact $C_C$).

TABLE 1

| | Simulated energy per switching (nJ) | | |
|---|---|---|---|
| Switching Case | No Cc | Cc to Ground | Exact Cc |
| Single switching | 1.442 ($C_g$) | 2.249 ($C_g + C_c$) | 2.249 ($C_g + C_c$) |
| Same direction (simultaneous) | 2.884 ($2C_g$) | 4.498 $2(C_g + C_c)$ | 2.884 ($2C_g$) |
| Opposite direction (simultaneous) | 2.888 ($2C_g$) | 4.498 $2(C_g + C_c)$ | 6.090 ($2C_g + 4C_c$) |
| Same direction (large delay) | 2.884 ($2C_g$) | 4.498 $2(C_g + C_c)$ | 4.498 $2(C_g + C_c)$ |
| Opposite direction (large delay) | 2.888 ($2C_g$) | 4.498 $2(C_g + C_c)$ | 4.498 $2(C_g + C_c)$ |

From Table 1, it is observed that ignoring coupling leads to large underestimation of energy dissipation in most cases, up to 53% in case of simultaneous opposite switching. In addition, modeling coupling as capacitance to ground also leads to large errors ranging from underestimating energy dissipation by 26% for the case of simultaneous opposite switching to overestimating energy dissipation by 56% in the case of simultaneous similar switching. Furthermore, the relative delays between switchings cause significant differences in energy dissipation. Thus, it is evident that for the coupling power to be accurately estimated, both relative switching activities and timing should be considered.

It should be noted that power estimation generally refers to the problem of estimating the average power dissipation of digital circuits. This differs from the worst case instantaneous power, often referred to as the voltage drop problem. Thermal issues in integrated circuits are directly related to the average power.

EXAMPLE 1

This section describes the proposed approach to dynamic power estimation that considers the impact of coupling. It is established that, coupling power is dependent on relative switching activities and switching times of the coupled interconnects. Hence, switching probabilities, as well as, switching probability density functions PDFs, indicating the probability that a switching happens at a specific time, must be accurately calculated for each net in the circuit.

FIG. 4 illustrates how the switching-PDFs can be used for accurate coupling power estimation. Using the switching-PDFs, the probabilities that the coupled interconnects switch in the same direction or in opposite directions as a function of the relative delay $\delta$ between their switching times, denoted as $p_{sim}(\delta)$ and $p_{opp}(\delta)$ respectively, can be calculated. Using, $p_{sim}(\delta)$ and $p_{opp}(\delta)$ along with the models of coupling power dissipation as a function of the relative delay $\delta$, average coupling power can be calculated. Therefore, switching-probabilities, i.e. the probabilities for rise, fall, stay low, and stay high, as well as, the switching-PDFs for rise and fall must be evaluated of for each interconnect in the circuit.

However, accounting for all possible switchings in large circuits is impractical as runtime and storage explodes exponentially with circuit size. Initially, the approach to approximate the switching probability density functions PDFs for efficient propagation is proposed. Next, the propagation of switching probabilities and the proposed presentation of the switching PDFs is introduced. Finally, the power estimation approach, which is based on the obtained switching probabilities and PDFs, is explained.

Accurate probability and timing information are critical in coupling power estimation. The switching-PDF is a discrete-time waveform representing the probability that a switching occurs at a specific time. The exact switching-PDF is represented as a finite group of delta-dirac functions with positions indicating the possible switching times and amplitudes indicating the probability that switching at these specific times occur. An arbitrary switching-PDF is illustrated in FIG. 5a. Considering complete switching information during timing analysis of a given circuit involves enumeration of all possible input vectors. This approach is exponential in complexity and is therefore computationally prohibitive. On the other hand, completely ignoring the details of switching information causes the timing information of each net in the circuit to be represented as a switching-window and a set of slew rates, such that switching occurs at a time inside the specified window and have a slew rate in the specified range. This approach is often used in simple static timing analysis, where the only concern is the worst case delay, and introduces lot of uncertainties regarding the probability of a switching happening at a specific time.

Symbolically, the switching-windows for the rise and fall transitions of any net x are denoted as $x^r$ and $x^f$ respectively. Each of the switching-windows $x^r$ and $x^f$ of a net x is often defined as an interval [l, h], such that the time of any possible signal switching of the net lies in this interval. An assumption of a uniform probability density for switching in this interval is unrealistic. The probability density function PDF for switching in a given window is formally denoted as $\phi(t)$ such that:

$$\phi_x(t)=0; t \notin [l_x, h_x] \text{ and } \int_l^h \phi_x(t) \le 1 \quad (1)$$

Efficient representation and propagation of an arbitrary PDF $\phi_x(t)$ is challenging and can be computationally very expensive. Hence, the proposed approach is to represent each switching-window x as a set of M sub-switching-windows each having a constant PDF $\phi_{xi}$ in their respective intervals $[l_{xi}, h_{xi}]$ (i=1, 2 ..., M) as illustrated in FIG. 4(b). Such an approach definitely captures the PDF more accurately than the assumption of a uniform PDF in the complete interval $[l_x, h_x]$. In addition, it allows trading off complexity and runtime for higher accuracy by increasing the number of sub-switching-windows M allowing the PDF to become closer to any arbitrary shape.

The approach to represent a switching window having an arbitrary discrete-time PDF $\phi_x(t)$ as a set of M sub-switching-windows each having a constant PDF is explained as follows. For simplicity, the interval $[l_x, h_x]$ is initially segmented into M equal length intervals. The interval $[l_{xi}, h_{xi}]$ of a sub-switching-window i is therefore given by:

$$l_{xi} = l_x + \frac{(i-1)(h_x - l_x)}{M} \quad (2)$$

$$h_{xi} = l_x + \frac{(i)(h_x - l_x)}{M} \quad (3)$$

To evaluate the constant PDF for any sub-switching-window, the probability of switching in that sub-switching-window interval is matched to that of the original switching window in the same interval. Thus, $\phi_{xi}$ is computed as:

$$\phi_{xi} = \frac{1}{(h_{xi} - l_{xi})} \int_{l_{xi}}^{h_{xi}} \phi_x(t) dt \quad (4)$$

It is immediate that this approach preserves the total switching probability in a window. This procedure is employed separately to represent the rise and fall switching-windows on any given net, each into M sub-switching-windows.

In this section, the approach to propagate the set of sub-switching-windows through logic blocks in a circuit is described. For illustration, the switching probabilities and PDFs propagation for a two-input AND gate is explained. The switching probabilities and PDFs propagation for all other logic gates, including those with more than two inputs, is performed in a similar way.

One of the major concerns in probabilistic power estimation is to account for dependencies between different nodes due to spatiotemporal correlations. Such correlations stem from reconvergent fan-out among different signal lines in the circuit and correlations among the input signals resulting from actual input sequence [18]. It is very difficult to manage the exact complex correlations at acceptable levels of computational work [11-13, 18]. However, spatiotemporal correlations can be effectively accounted for through the use of pair-wise correlation coefficients [11-13, 18]. A probabilistic model for spatiotemporal correlations among the primary inputs and internal lines of the circuits [18] can be easily used in our framework. It considers the transition correlation coefficients for all 16 possible transitions of a pair of signals and models them by a lag-one Markov chain with four states. The transition correlation coefficients for any two signals x and y are defined as $$\kappa_{i,j}^{xy} = \frac{Pr_x[i] \cap Pr_y[j]}{Pr_x[i] \cdot Pr_y[j]} \quad (5)$$

where i and j represent the transition for nodes x and y respectively and can take one of four values {l, r, f, h} corresponding to the four possible transitions of a node, namely low (steady at logic 0), rise, fall, and high (steady at logic 1) respectively.

Calculation of the correlation coefficients is based on OBDDs. While using global OBDDs is more accurate, it is limited to small circuits due to huge space complexity. Using local OBDDs that represent the logic function in terms of the immediate fan-in cone of the node proves to offer good accuracy and computation efficiency [13, 18]. Hence, the calculation of the transition correlation coefficients is performed using local OBDDs as described in [18].

Consider now an AND gate with inputs a and b, and output c as shown in FIG. 5. The rise (fall) switching of input a is represented by M sub-switching-windows $a^r_i(a^f_i)$, (i=1, 2 ..., M). The interval of each sub-switching-windows $a^r_i(a^f_i)$ is denoted by $[l_{a\,i}^{\,r}, h_{a\,i}^{\,r}]$ ($[l_{a\,i}^{\,f}, h_{a\,i}^{\,f}]$) and the density within each interval is denoted by a constant $\phi_{a\,i}^{\,r}(\phi_{a\,i}^{\,f})$. The probabilities of the possible transitions within a clock cycle for input a are denoted by $Pr_a[l]$, $Pr_a[r]$, $Pr_a[f]$, and $Pr_a[h]$. A similar representation is used for input b.

Timing information, represented as delays, is incorporated into the framework at this step. The proposed approach for power estimation is independent of the technique used to obtain the timing information. However, using an accurate technique to obtain the timing information leads to accurate results of the coupling power estimation. A simple gate delay model is employed to illustrate the idea. The proposed approach can definitely be used with more complex delay models. The delay of the timing arc from input a to output c for a rise (fall) switching is denoted as $d_a^r$ ($d_a^f$). A similar representation is used for the delay of input b.

Given this information, the switching-probabilities and switching-PDFs at the output c need to be calculated. However, for further propagation, the rise (fall) switching PDF at output c should be represented by just M sub-switching-windows. Note that for M=1, this approach falls back to the traditional single switching-window approach, with $Pr_c[r]+Pr_c[f]$ as the traditional switching activity.

The probability that c has a fall switching is given by:

$$Pr_c[f] = \kappa_{h,f}^{ab} Pr_a[h]Pr_b[f] + \kappa_{f,h}^{ab} Pr_a[f]Pr_b[h] + \kappa_{f,f}^{ab} Pr_a[f]Pr_b[f] \quad (6)$$

Hence, the switching-PDF for the fall transition of output c denoted by $\phi_c^f(t)$ is given by the following:

$$\phi_c^f(t) = \kappa_{h,f}^{ab} Pr_a[h] \phi_b^f(t-d_b^f) + \kappa_{f,h}^{ab} Pr_b[h] \phi_a^f(t-d_a^f) + \quad (7)$$
$$\kappa_{f,f}^{ab} \phi_a^f(t-d_a^f) \int_{-\infty}^{t} \phi_b^f(x-d_b^f)dx + \kappa_{f,f}^{ab} \phi_b^f(t-d_b^f) \int_{-\infty}^{t} \phi_a^f(x-d_a^f)dx$$

Note that the continuous integral notation is being used in (7) rather than the discrete summation notation since the switching-PDFs are being represented as continuous waveforms as proposed in the previous subsection. Given that the input switching-PDFs are represented as a set of M sub-switching-windows each having a constant density, $\phi_c^f(t)$ can be expressed as:

$$\phi_c^f(t) = \kappa_{h,f}^{ab} Pr_a[h] \sum_{i=1}^{M} \phi_{bi}^f(t-d_b^f) + \kappa_{f,h}^{ab} Pr_b[h] \sum_{i=1}^{M} \phi_{ai}^f(t-d_a^f) + \quad (8)$$
$$\kappa_{f,f}^{ab} \sum_{i=1}^{M} \sum_{j=1}^{M} \phi_{ai}^f(t-d_a^f) \int_{-\infty}^{t} \phi_{bj}^f(x-d_b^f)dx +$$
$$\kappa_{f,f}^{ab} \sum_{i=1}^{M} \sum_{j=1}^{M} \phi_{bi}^f(t-d_b^f) \int_{-\infty}^{t} \phi_{aj}^f(x-d_a^f)dx$$

where, (expressions for $\phi_{a\ i/j}^r(t)$, $\phi_{a\ i/j}^f(t)$, $\phi_{b\ i/j}^r(t)$, $\phi_{b\ i/j}^f(t)$ are similar)

$$\phi_{ai}^r(t) = \begin{cases} \phi_{ai}^r; & t \in [l_{ai}^r, h_{ai}^r] \\ 0; & \text{otherwise} \end{cases} \quad (9)$$

The last two terms in (7) and also in (8) denote the probability density function that the output c switches at time t due to both inputs a and b switching by the time t. The probability that the output c switches at time t is equal to the probability that one input a (b) switches at time t while the other input b (a) switches at the same time t or earlier. Each inner integral in (8) denotes the area of that sub-switching-window lying on the left of t, that is, the probability of the sub-switching-window switching at time t or earlier.

FIG. 6 shows the illustrative example of the two-input AND gate with M=2. The transition correlation coefficients, switching probabilities and times of the inputs are as shown in figure. The fall switching-PDF of the output $\phi_c^f$ is computed as the sum of three PDFs that correspond to the terms in (6). FIG. 6 shows the calculation details of the third PDF in FIG. 6, which corresponds to the last term in (6), from the fall switching-PDFs of the inputs a and b.

Finally, for further propagation through the circuit, the switching window of the output c is partitioned into M sub-switching-windows of equal intervals. The probability of a fall switching within each interval is given by the area under $\phi_c^f(t)$ in this interval, such that the probability of switching in a sub-interval is preserved. The uniform density of this interval $\phi_{c\ i}^f$ is computed in the same way as in (4). The approximated switching-PDF $\phi_c^f$, which will be propagated, is drawn using a dashed line in FIG. 6. As mentioned earlier, increasing the number of the sub-intervals M improves the accuracy of the approach.

The rise switching probability and PDF of the output c are evaluated in exactly the same way. The presented approach can be easily extended to other logic blocks, and is not limited to 2-input gates. Single input logic blocks (inverter, buffer, and wire delay) just cause time shifting while the shape of the PDFs is not affected. Thus, they do not require such computations for the switching PDFs at their output. Regarding the practical implementation, these computations are done much faster by avoiding any numerical integration. The probability of switching in any interval is evaluated as the difference in the switching cumulative distribution function CDF at the interval's upper and lower bounds. The switching CDF can actually be evaluated analytically without numerical integration.

Once switching-probabilities and switching-PDFs have been evaluated on the fan-out nets of all gates in a circuit, the dynamic power dissipation can be computed by summing the switching power corresponding to all gates in the circuit. For each gate x, the average dynamic power $P_d^x$ dissipated per clock cycle is given by:

$$P_d^x = P_g^x + P_c^x \quad (10)$$

$$P_g^x = \frac{1}{2} C_g^x V_{dd}^2 f (Pr_x[r] + Pr_x[f]) \quad (11)$$

$$P_c^x = \sum_{i=1}^{k} P_c^{xi} \quad (12)$$

where, $P_g^x$ denotes the power dissipation in the total output capacitance to ground $c_g^x$. f denotes the maximum switching frequency, which is equal to the clock frequency since the inputs may change every clock cycle. $Pr_x[r]$ ($Pr_x[f]$) denotes the probability of a rise (fall) switching at the output. $P_c^x$ denotes the power dissipation due to coupling (coupling power) in the fan-out net, and is given by the sum of coupling power components $P_c^{xi}$ introduced by each of the k coupling capacitors to the k coupled neighbors of the fan-out net. For each coupled neighbor i with coupling capacitance $C_c^{xi}$, $$P_c^{xi} = P_{quiet}^{xi} + P_{opp}^{xi} + P_{sim}^{xi} \quad (13)$$

$$P_{quiet}^{xi} = \frac{1}{2} C_c^{xi} V_{dd}^2 f \begin{pmatrix} \kappa_{r,l}^{xi} Pr_x[r]Pr_i[l] + \kappa_{f,l}^{xi} Pr_x[f]Pr_i[l] + \\ \kappa_{r,h}^{xi} Pr_x[r]Pr_i[h] + \kappa_{f,h}^{xi} Pr_x[f]Pr_i[h] \end{pmatrix} \quad (14)$$

$$P_{opp}^{xi} = \frac{1}{2}C_c^{xi}V_{dd}^2 f \int_{-\infty}^{\infty} p_{opp}^{xi}(\delta)\psi_{opp}^{xi}(\delta)d\delta \quad (15)$$

$$P_{sim}^{xi} = \frac{1}{2}C_c^{xi}V_{dd}^2 f \int_{-\infty}^{\infty} p_{sim}^{xi}(\delta)\psi_{sim}^{xi}(\delta)d\delta \quad (16)$$

$P^{xi}_{quiet}$, $P^{xi}_{opp}$ and $P^{xi}_{sim}$ denote the coupling power when the coupled neighbor i is not switching, switching in the opposite direction and switching in the same direction respectively. $P^{xi}_{opp}$ and $P^{xi}_{sim}$ are timing dependant, that is, they depend on the relative switching activity as well as relative switching delay $\delta$ of the two coupled nets. $p^{xi}_{opp}(\delta)$ denotes the joint PDF that the two coupled nets switch in opposite directions as a function of their relative delay $\delta$. $\psi^{xi}_{opp}(\delta)$ denotes the effective coupling power factor for the two coupled nets switching in opposite directions as a function of their relative delay $\delta$. $p^{xi}_{sim}(\delta)$ and $\psi^{xi}_{sim}(\delta)$ are similarly defined for the two coupled nets switching in the same direction.

Typical models for $\psi^{xi}_{opp}(\delta)$ and $\psi^{xi}_{sim}(\delta)$ are shown in FIG. 8; $\psi^{xi}_{opp}(\delta)$ and $\psi^{xi}_{sim}(\delta)$ are the models of coupling power as a function of relative delay $\delta$, shown earlier in FIG. 2, divided by 2 to attribute half of the power to each gate, and then divided by $\frac{1}{2}C_C V_{DD}^2$ for normalization. In general, $\psi^{si}_{opp}(\delta)$ and $\psi^{xi}_{sim}(\delta)$ depend on the slews of the switching signals and is symmetric in nature. In FIG. 8, S is a function of the slews of the switching nets.

For two coupled wires x and y, $p^{xy}_{opp}(\delta)$ and $p^{x,y}_{sim}(\delta)$ are given by:

$$P_{opp}^{xy}(\delta) = \kappa_{r,f}^{xy}\int_{-\infty}^{\infty}\phi_x^r(t)\phi_y^f(t+\delta)dt + \kappa_{f,r}^{xy}\int_{-\infty}^{\infty}\phi_y^r(t)\phi_x^f(t+\delta)dt \quad (17)$$

$$P_{sim}^{xy}(\delta) = \kappa_{r,r}^{xy}\int_{-\infty}^{\infty}\phi_x^r(t)\phi_y^r(t+\delta)dt + \kappa_{f,f}^{xy}\int_{-\infty}^{\infty}\phi_y^f(t)\phi_x^f(t+\delta)dt \quad (18)$$

Since each of the rise and fall switching-PDFs on x and y is represented as a set of M sub-switching-windows, the computation translates to a summation for all sub-switching-window pairs as follows.

$$P_{opp}^{xy}(\delta) = \quad (19)$$
$$\kappa_{r,f}^{xy}\sum_{i=1}^{M}\sum_{j=1}^{M}\int_{-\infty}^{\infty}\phi_{xi}^r(t)\phi_{yj}^f(t+\delta)dt + \kappa_{f,r}^{xy}\sum_{i=1}^{M}\sum_{j=1}^{M}\int_{-\infty}^{\infty}\phi_{yi}^r(t)\phi_{xj}^f(t+\delta)dt$$

$$P_{sim}^{xy}(\delta) = \quad (20)$$
$$\kappa_{r,r}^{xy}\sum_{i=1}^{M}\sum_{j=1}^{M}\int_{-\infty}^{\infty}\phi_{xi}^r(t)\phi_{yj}^r(t+\delta)dt + \kappa_{f,f}^{xy}\sum_{i=1}^{M}\sum_{j=1}^{M}\int_{-\infty}^{\infty}\phi_{yi}^f(t)\phi_{xj}^f(t+\delta)dt$$

The shape of one of the inner integrals that appear in (19) and (20) is illustrated in FIG. 9. For illustration, FIG. 9 shows an example of calculating $P^{xy}_{opp}$ for a single pair of sub-switching-windows where x is rising and y is falling. $p^{xy}_{opp}(\delta)$ is evaluated from the PDFs of $\phi_{x,i}^r(t)$ and $\phi_{y,j}^f(t)$. Then, the resultant joint PDF of switching in opposite directions $p^{xy}_{opp}(\delta)$ is multiplied by the effective coupling power factor $\psi^{xy}_{opp}(\delta)$. The integration of their multiplication in (15), (i.e. the area under their multiplication curve), denotes the summation of all possible cases of power dissipation for switching in opposite directions as function of $\delta$ each multiplied by its probability, resulting in the average coupling power for switching in opposite direction.

The procedure illustrated in FIG. 8, is performed for each of the inner integrals that appear in (19) and (20). Regarding practical implementation, these computations are also done much faster by avoiding any numerical integration $p^{xi}_{opp}$ and $P^{xi}_{sim}$ are calculated using analytical expressions for $p_{opp}(\delta)$, $p_{sim}(\delta)$, $\psi_{opp}(\delta)$, $\psi_{sim}(\delta)$, as well as analytical expressions for the results of the integrations.

This subsection describes how the proposed framework is amicable to the incorporation of power dissipation in glitches, often termed as toggle power. The approach is illustrated with an example of a 2-input AND gate with inputs a and b, and output c. In this case, a glitch is only formed at the output c only when one input a (b) rises then the other input b (a) falls after some relative delay $\delta$. The toggle power due to this glitch is thus associated with the probability of the two inputs of the AND gate switching in opposite directions. Since the switching-PDFs are already being calculated at each node of the circuit, the joint PDF that the two inputs a and b switch in opposite directions $p^{ab}_{opp}(\delta)$ can be easily computed in the same way as illustrated for the nets across a coupling capacitor in (19) keeping in mind that a and b are now the inputs of the AND gate rather than the nets across a coupling capacitance. The computation of $p^{ab}_{opp}(\delta)$ in this case should also consider the difference in the timing arcs delays $d_a$ and $d_b$ for the inputs to account for the gate inertial delay that results in glitch filtering [13]. Thus, the joint PDF of the two inputs a and b switching in opposite directions $p^{ab}_{opp}(\delta)$ is given by:

$$P_{opp}^{ab}(\delta) = \kappa_{r,f}^{ab}\sum_{i=1}^{M}\sum_{j=1}^{M}\int_{-\infty}^{\infty}\phi_{ai}^r(t-d_a^r)\phi_{bj}^f(t-d_b^f+\delta)dt + \quad (21)$$
$$\kappa_{f,r}^{ab}\sum_{i=1}^{M}\sum_{j=1}^{M}\int_{-\infty}^{\infty}\phi_{bi}^r(t-d_b^r)\phi_{aj}^f(t-d_a^f+\delta)dt$$

The relative delay $\delta$ as formulated in (21) denotes the time by which the falling input switches after the rising input. The power dissipation due to a glitch is a function of the relative delay $\delta$ between the switching times of the inputs. $\phi(\delta)$ denotes the effective toggle power factor as a function of this relative delay $\delta$. The toggle power per cycle at the output c of the AND gate is given by:

$$P_{toggle}^c = \frac{1}{2}C_g^c V_{dd}^2 \int_{-\infty}^{\infty} p_{opp}^{ab}(\delta)\varphi(\delta)d\delta \quad (22)$$

where $C_g^c$ is the gate load capacitance, $p^{ab}_{opp}(\delta)$ denotes the joint PDF for the two inputs switching in opposite direction with a relative delay $\delta$, and $\phi(\delta)$ denotes the effective toggle power factor for the two inputs switching in opposite directions.

In our AND gate example, if the falling input switches before the rising one indicated by a negative $\delta$, there is no glitch and hence no power dissipation. Therefore, $\phi(\delta)=0$ for $\delta \leq 0$. Also, if the relative delay $\delta$ is short compared to the slew of the inputs and output, then the glitch will have a partial swing proportional to the relative delay rather than a full swing. Therefore, the power dissipated is proportional to the partial swing and the relative delay. When the relative delay is large enough, the glitch will have a full swing and hence the power dissipated will be constant independent of the relative delay $\delta$. FIG. 10 illustrates the model of $\phi(\delta)$, S' as a function of the slews.

The proposed approach is easily extended to other logic gates. Regarding practical implementation, these computations are also done much faster by avoiding any numerical integration and using analytical expressions.

In this section, the estimated dynamic power dissipations for the ISCAS'85 benchmarks [20] are presented. Benchmarks are mapped to 90 nm technology library parameters. A simple delay model [21] is used. For all primary inputs, the switching-probabilities Pr[l], Pr[r], Pr[f], and Pr[h] are set to 0.25 each and their switching PDFs are set to a uniform density short time interval. This assumption ensures unbiased equal switching probabilities for all of them.

First, the number of sub-switching-windows M has to be selected. The estimated dynamic power with M sub-switching-windows for a benchmark x is denoted as $P^x_M$. The choice of M represents a tradeoff between accuracy and runtime. Although the accuracy of power estimation improves for larger M, the run time increase is not commensurate with the accuracy gain. As an example, for the benchmark C5315, the run-time to obtain $P^{C5315}_{1000}$ is nearly 28 hours. Simulation based Monte Carlo approaches to accurate power estimation require a very large number of input vectors, which is prohibitive. HSPICE simulations for small test cases show less than 1% error in $p^x_{1000}$. Therefore, $P^x_{1000}$ is chosen as the reference in comparing the accuracy for different values of M. For all the benchmarks, the calculated error is plotted as a function of M. On the same graph, the runtime ratio is also plotted as a function of M. The runtime ratio denotes the ratio of the runtime of the proposed approach with M sub-switching-windows to that of the base case with M=1 (single window). FIG. 11 shows such graph for the C5315 benchmark, which displayed the worst accuracy. From these plots, M=6 represents a good tradeoff between accuracy and runtime. Hence, M=6 is used in the experiments for all benchmarks for fair comparison.

The developed framework compares the dynamic power estimation in three different situations, illustrated in FIG. 3 (i) no coupling capacitance, and hence, coupling power is completely ignored (denoted as No Coupling "NC"); (ii) all coupling capacitances are modeled as capacitance connected to ground, and consequently, the timing dependence of the coupling power is completely ignored (denoted as Fixed Coupling "FC"); and (iii) the timing dependence of coupling power is considered using the proposed approach with 6 switching sub-windows (denoted as Timing Dependent Coupling "TDC"). The choice of these three cases enables a relative comparison to evaluate the significance of the timing dependence of coupling power.

It is intuitive that the results of the first two engines NC and FC will not be as accurate as the TDC engine results. Hence, the TDC engine results are used as the reference in the comparison. The difference in the estimated coupling power ($\Delta P_c$) and dynamic power ($\Delta P_d$) using NC and FC relative to TDC for all benchmarks are presented in Table 2, along with the run-time overhead of TDC vs. FC ($t^{TDC}/t^{FC}$). Since NC ignores coupling power, it is immediate that coupling power error for NC equals −100%. As a result, NC underestimates dynamic power on the average by 48%. On the other hand, considering coupling capacitances as connected to ground can either overestimate or underestimate coupling power by 59% or 21% respectively, which correspond to 25% or 12% of dynamic power respectively. The average error in estimated coupling power and dynamic power using FC is 28% and 13% respectively. Finding estimate bounds, while ignoring the timing dependence of coupling power, is not practical. As the results indicate, considering the timing dependence of coupling power is important in deep submicron technologies.

TABLE 2

Percentage Errors in Coupling and Total Power Estimations

| Benchmark Circuit | Nodes | $\Delta P_c$ (%) NC | $\Delta P_c$ (%) FC | $\Delta P_d$ (%) NC | $\Delta P_d$ (%) FC | $t^{TDC}/t^{FC}$ |
|---|---|---|---|---|---|---|
| C432 | 198 | −100 | 59 | −42 | 25 | 3.5 |
| C499 | 245 | −100 | 51 | −37 | 19 | 5.0 |
| C880 | 445 | −100 | 37 | −40 | 15 | 4.6 |
| C1355 | 589 | −100 | −19 | −56 | −11 | 3.6 |
| C1908 | 915 | −100 | −21 | −58 | −12 | 4.1 |
| C2670 | 1428 | −100 | 35 | −46 | 16 | 4.6 |
| C3540 | 1721 | −100 | −6 | −53 | −3 | 3.8 |
| C5315 | 2487 | −100 | 28 | −43 | 12 | 4.2 |
| C6288 | 2450 | −100 | 5 | −49 | 3 | 3.0 |
| C7552 | 3721 | −100 | −17 | −57 | −10 | 4.4 |
| |Average| | | 100 | 28 | 48 | 13 | 4.1 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1] D. Liu and C. Svensson, "Power consumption estimation in CMOS VLSI chips," in IEEE Journal of Solid State Circuits, Vol 29, 1994, pp. 663-670.

[2] R. Mehra, L. M. Guerra, and J. M. Rabaey, "A partitioning scheme for optimizing interconnect power," in IEEE Journal of Solid State Circuits, Vol 32, 1997, pp. 433-443.

[3] E. D. Man and M. Schobinger, "Power dissipation in the clock system of highly pipelined ULSI CMOS circuits," in Proc. International Workshop on Low Power Design, 1994, pp. 133-138.

[4] P. Gupta and A. B. Kahng, "Quantifying error in dynamic power estimation of CMOS circuits," in Proc. Intl. Symposium on Quality Electronic Design, 2003, pp. 273-278.

[5] S. C. Wong, G. Y. Lee, and D. J. Ma, "Modeling of interconnect capacitance, delay and crosstalk in VLSI," in IEEE Transactions on Semiconductor Manufacturing, Vol 13, 2000, pp. 108-111.

[6] International Technology Roadmap for Semiconductors, 2001 Edition, Semiconductor Industry Association, http://public.itrs.net.

[7] M. Ghoneima and Y. Ismail, "Effect of relative delay on the dissipated energy in coupled interconnects," in Proc. Intl. Symposium on Circuits and Systems, 2004, pp. 525-528.

[8] S. M. Kang, "Accurate simulation of power dissipation in VLSI circuits," in IEEE Journal of Solid State Circuits, Vol 21(5), 1986, pp. 889-891.

[9] M. A. Cirit, "Estimating dynamic power consumption of CMOS circuits," in Proc. Intl. Conf. on Computer-Aided Design, 1987, pp. 534-537.

[10] F. Najm, R. Burch, P. Yang, and I. Hajj, "Probabilistic simulation for reliability analysis of CMOS VLSI circuits," in IEEE Transactions on Computer Aided Design, 1990, pp. 439-450.

[11] G. I. Stamoulis and I. N. Hajj, "Improved techniques for probabilistic simulation including signal correlation effects," in Proc. of the Design Automation Conf., 1993, pp. 379-383.

[12] C. Y. Tsui, M. Pedram, and A. M. Despain, "Efficient estimation of dynamic power consumption under a real delay model," in Proc. Intl. Conf. on Computer-Aided Design, 1993, pp. 224-228.

[13] C. S. Ding, C. Y. Tsui, M. Pedram, "Gate-level power estimation using tagged probabilistic simulation," in IEEE Transactions on Computer Aided Design, 1998, vol. 17, no. 1, pp. 1099-1107.

[14] F. Najm, "A survey of power estimation techniques in VLSI circuits," *IEEE Transactions on VLSI Systems,* 1994, vol. 2, no. 4, pp. 446-455.

[15] C. Y. Tsui, J. Monteiro, M. Pedram, A. Despain, S. Devadas, B. Lin, "Power Estimation Methods for Sequential Logic Circuits," IEEE Transactions on VLSI Systems, 1995, vol. 3, no. 3, pp. 404-416.

[16] T. Uchino and J. Cong, "An interconnect energy model considering coupling effects," in Proc. of the Design Automation Conf., 2001, pp. 555-558.

[17] A. Ghosh, S. Devdas, K. Keutzer, and J. White, "Estimation of average switching activity in combinational and sequential circuits," in Proc. of the Design Automation Conf., 1992, pp. 253-259.

[18] R. Marculescu, D. Marculescu, M. Pedram, "Probabilistic modeling of dependencies during switching activity analysis," in IEEE Transactions on Computer Aided Design, 1998, vol. 17, no. 2, pp. 73-83.

[19] M. Xakellis and F. Najm, "Statistical estimation of the switching activity in digital circuits," in Proc. of the Design Automation Conf., 1994, pp. 728-733.

[20] F. Brglez and H. Fujiwara, "A neutral netlist of 10 combinatorial benchmark circuits," in Proc. Intl. Symposium on Circuits and Systems, 1985, pp. 695-698.

[21] A. Agarwal, K. Chopra, and D. Blaauw, "Statistical timing based optimization using gate sizing," in Proc. DATE: Design Automation and Test in Europe, 2005, pp. 400-405.

What is claimed is:

1. A process for dynamic timing-dependent power estimation for a digital circuit having coupled interconnects and at least two gates, comprising the steps of:
   (a) capturing information on relative switching activities and timing dependence for the coupled interconnects in the digital circuit;
   (b) storing the captured information in a memory;
   (c) estimating the probabilities associated with switching activities and timing dependence for each gate in the digital circuit from the captured information;
   (d) obtaining dynamic power estimation of the digital circuit from the estimations of the probabilities,
   wherein the step of estimating the probabilities associated with switching activities and timing dependence comprises calculating the probability that a particular switching activity occurs at a specific time, for each gate in the digital circuit, and,
   wherein the step of calculating the probability that a particular switching activity occurs at a specific time comprises calculating the relative switching probability for rise, fall, stay low, and stay high, for each gate of the digital circuit.

2. The process of claim 1, wherein the step of estimating the probabilities associated with switching activities and timing dependence comprises calculating a switching probability density function for each gate in the digital circuit.

3. The process of claim 2, wherein the step of calculating the probability density function comprises estimating the probability that the coupled interconnects switch in the same direction or opposite directions, as a function of the relative delay between each respective switching time, for rise and fall.

4. The process of claim 3, further comprising the step of, for a switching window defining a specific interval of time, representing the switching window as a set of sub-switching windows for rise and fall, wherein each sub-switching window has a constant probability density function.

5. The process of claim 1, wherein the step of obtaining the dynamic power estimation comprises calculating the average dynamic power dissipated per clock cycle for each gate in the circuit and summing all of the respective dynamic power dissipations together.

6. The process of claim 5, wherein the step of calculating the average dynamic power dissipated for each gate further comprises the steps of:
   (a) calculating the total output capacitance to ground of the coupled neighbor interconnect, and an associated coupling power factor; and
   (b) calculating the coupling power contributed from components of the coupling capacitors for the coupled interconnects.

7. The process of claim 6, wherein the coupling power components comprise:
   (a) coupling power when a respective coupled neighbor is not switching, based on the probability that the respective neighbor interconnect is not switching;
   (b) coupling power when a respective coupled neighbor is switching in the opposite direction, based on the probability density function for two coupled interconnects switching in the opposite direction as a function of the relative delay and the associated coupling power factor; and
   (c) coupling power when a respective coupled neighbor is switching in the same direction, based on the probability density function for two coupled interconnects switching in the same direction as a function of the relative delay and the associated coupling power factor.

8. The process of claim 1, further comprising the step of calculating a toggle power associated with the coupled interconnects as a function of the relative delay between switching times of the respective inputs for each gate in the digital circuit.

9. A system for dynamic timing-dependent power estimation for a digital circuit having coupled interconnects and at least two gates, comprising:
   (a) a controller programmed to perform the steps of:
      (i) capturing information on relative switching activities and timing dependence for the coupled interconnects in the digital circuit;
      (ii) estimating the probabilities associated with switching activities and timing dependence for at least one gate in the digital circuit from the captured information; and
      (iii) obtaining dynamic power estimation of the digital circuit from the estimations of the probabilities; and
   (b) a memory device in communication with the controller to store the captured information,
      wherein the step of estimating the probabilities associated with switching activities and timing dependence comprises calculating the probability that a particular switching activity occurs at a specific time, for each gate in the digital circuit, and, wherein the step of calculating the probability that a particular switching activity occurs at a specific time comprises calculating the relative switching probability for rise, fall, stay low, and stay high, for each gate of the digital circuit.

10. The system of claim 9, wherein the step of estimating the probabilities associated with switching activities and timing dependence comprises calculating a switching probability density function for each gate in the digital circuit.

11. The system of claim 10, wherein the step of calculating the probability density function comprises estimating the probability that the coupled interconnects switch in the same direction or opposite directions, as a function of the relative delay between each respective switching time, for rise and fall.

12. The system of claim 11, further comprising the step of, for a switching window defining a specific interval of time, representing the switching window as a set of sub-switching windows for rise and fall, wherein each sub-switching window has a constant probability density function.

13. The system of claim 9, wherein the step of obtaining the dynamic power estimation comprises calculating the average dynamic power dissipated per clock cycle for each gate in the circuit and summing all of the respective dynamic power dissipations together.

14. The system of claim 13, wherein the step of calculating the average dynamic power dissipated for each gate further comprises the steps of:
 (a) calculating the total output capacitance to ground of the coupled neighbor interconnect, and an associated coupling power factor; and
 (b) calculating the coupling power contributed from components of the coupling capacitors for the coupled interconnects.

15. The system of claim 14, wherein the coupling power components comprise:

(a) coupling power when a respective coupled neighbor is not switching, based on the probability that the respective neighbor interconnect is not switching;
 (b) coupling power when a respective coupled neighbor is switching in the opposite direction, based on the probability density function for two coupled interconnects switching in the opposite direction as a function of the relative delay and the associated coupling power factor; and
 (c) coupling power when a respective coupled neighbor is switching in the same direction, based on the probability density function for two coupled interconnects switching in the same direction as a function of the relative delay and the associated coupling power factor.

16. The system of claim 9, further comprising the step of calculating a toggle power associated with the coupled interconnects as a function of the relative delay between switching times of the respective inputs for each gate in the digital circuit.

17. A non-transitory storage medium having computer-executable instructions, for dynamic timing-dependent power estimation for a digital circuit having coupled interconnects and at least two gates, stored thereon that, when executed by a controller, cause a computer to:
 (a) capture information on relative switching activities and timing dependence for the coupled interconnects in the digital circuit;
 (b) estimate the probabilities associated with switching activities and timing dependence for each gate in the digital circuit from the captured information; and
 (c) obtain dynamic power estimation of the digital circuit from the estimations of the probabilities, wherein the probabilities associated with switching activities and timing dependence comprises are estimated by calculating the probability that a particular switching activity occurs at a specific time, for each gate in the digital circuit, and wherein calculating the probability that a particular switching activity occurs at a specific time comprises calculating the relative switching probability for rise, fall, stay low, and stay high, for each gate of the digital circuit.

* * * * *